United States Patent
Gilbert

[11] 3,904,040
[45] Sept. 9, 1975

[54] STABILIZING MEANS FOR A BATTERY GRID PASTING BELT

[76] Inventor: Robert O. Gilbert, R.D. No. 2, Gettysburg, Pa. 17325

[22] Filed: June 6, 1974

[21] Appl. No.: 477,057

[52] U.S. Cl. .................. 206/493; 206/307; 242/222
[51] Int. Cl.² ................... B65D 85/16; B65H 75/06
[58] Field of Search ............ 206/493, 307; 242/222

[56] References Cited
UNITED STATES PATENTS

| | | | |
|---|---|---|---|
| 1,616,874 | 2/1927 | Scheffey | 242/222 |
| 2,506,058 | 5/1950 | Bossmeyer | 206/307 |

*Primary Examiner*—Leonard Summer
*Attorney, Agent, or Firm*—C. Hercus Just

[57] ABSTRACT

A collapsible dimension-stabilizing assembly adapted to be inserted within a battery grid pasting belt susceptible to shrinkage during storage prior to installation for operation on a battery grid pasting machine, said assembly comprising a pair of semi-cylindrical end members held in spaced relationship by strut-like spacing means to provide an accurate circumferential dimension around said assembly upon which a pasting belt is disposed and thereby prevent shrinkage thereof and maintain the manufactured circumferential dimension required for mounting the belt upon a battery grid pasting machine without stretching and possibly damaging the belt.

4 Claims, 6 Drawing Figures

PATENTED SEP 9 1975  3,904,040

STABILIZING MEANS FOR A BATTERY GRID PASTING BELT

BACKGROUND OF THE INVENTION

The present invention pertains to manufacturing belts of precise circumferential dimension which are employed in machines upon which the lead grids which are incorporated in storage batteries are pasted, i.e., lead oxide is applied to the reticular pattern of the cast lead grids, for purposes of the pasted grids then being subjected to further processing prior to being mounted in clusters in cells of storage batteries. The lead oxide which is applied to said grids is of a somewhat abrasive nature, whereby the belts which support and carry the cast grids per se to a pasting unit in the machine are subjected to substantial abrasion from both the lead grids as well as the paste when applied to the grids. Accordingly, it is seldom that belts of the type currently used have a life greater than approximately 50–80 hours of use.

Grid casting or pasting machines of the type presently employed in the industry are provided with a pair of supporting rollers, one of which is driven, around which the aforementioned belt extends. The circumferential dimension of such belts is very precise. Also, when it becomes necessary to replace a used belt with a new one, the change preferably should occur quickly in order that continuous operation of the machine may not be impeded to any substantial extent. Accordingly, it is quite essential that new belts which are to be substituted for used belts must be of the precise circumferential dimension required by the machine and this has been difficult to provide in accordance with belts presently manufactured for the following reasons:

The viscous paste which is applied to the cast lead battery grids has a certain amount of moisture content to render the paste readily susceptible to being forced within the openings in the battery grids but, after the material has been forced into said openings, whereupon the grid becomes pasted, according to the language of the industry, it is preferred that at least some of the moisture be removed from the pasted plates or grids and this is at least partially accomplished by the belts having sufficient inherent absorptive properties to accomplish the desired amount of removal of moisture while the pasted plates are being carried upon the upper surface of the belts in the machine while the pasted plates are being moved to a discharge station. To provide adequate absorption of at least a certain amount of the moisture from the pasted plates, the belts which have been historically used in machines in which automatic pasting of the plates occurs have been formed primarily from cotton fibers. While such cotton fibers provide the desired absorption properties, the material is not as capable of resisting abrasion as, for example, other materials from which belts might be formed, such as rubber, and certain synthetic resin filaments. These additional materials have not been employed heretofore, however, because rubber has substantially no absorption properties and textile material woven from synthetic resin fibers has very little absorption properties, and certainly not anywhere near the amount of absorption properties which are desired for the formation of acceptable pasted battery grids or plates. Accordingly, cotton is still the preferred material from which such pasting belts are formed although, in recent years, the inclusion of possibly as much as 25% polyester fiber is incorporated in the remaining 75% of cotton fibers and this has been acceptable in an effort to increase the life of such battery grid pasting belts due to the capabilities of the polyester fibers having a greater tendency to resist abrasion than cotton fibers, without reducing the absorption capabilities of the belt to a level which is unacceptable to the industry.

Due to the fact, however, that the belts employed in battery grid pasting machines contain as much as 75% or more of cotton fibers, they are highly susceptible to shrinkage resulting from the moisture content of normal atmospheres, including even the atmospheres of storage facilities in which new belts are maintained until ready for use. Historically, it has been found that the normal manner of shipping and storing battery grid pasting belts is to flaten the belts and then roll them into a coil to provide a compact arrangement thereof. Even if the manufactured belt initially has a very low moisture content, when maintained in storage for any appreciable amount of time, the moisture present in normal atmospheres is absorbed by said belts and shrinks the same to dimensions which prevent the belts from readily being mounted in operative position upon the supporting and driving rollers of a battery grid pasting machine. To attempt to stretch such belts at the time of installation, it is not only difficult and awkward, but also frequently results in the belts being damaged. As a result, many such belts are returned to the manufacturer for stretching under controlled conditions but, unless immediately used following such conditioning of the belt by the manufacturer, shrinkage inevitably occurs if the belt is again subjected to an appreciable amount of storage time.

The foregoing difficulties are obviated by the present invention which is a very simple means for stabilizing the initial, accurate, manufactured dimension of belts to be employed in battery pasting machines which have precise circumferential requirements on the supporting rollers and the space between the rollers for purposes of accommodating the belt. Details of such stabilizing means are set forth below.

SUMMARY OF THE INVENTION

It is the principal object of the invention to provide a stabilizing device adapted to be mounted within a pasting belt for use on a battery grid pasting machine, said stabilizing means being collapsible for ready demounting with respect to the belts but also adapted to be quickly installed in stabilizing position within the belt in which position the belt is maintained in precise circumferential dimension and capable of resisting shrinkage from atmospheric or other sources of moisture, whereby the belt is adapted to be quickly mounted in operative position upon a battery grid pasting machine due to the accurate dimension being maintained in said belt until such time as the same is to be used.

It is another object of the present invention to form said collapsible stabilizing means for a battery grid pasting belt from relatively inexpensive material, the preferred embodiment of which comprises a pair of similar semi-cylindrical members having flat surfaces extending across the opposite edges between which the curved surfaces extend, and said elongated strut means extend between and abut said flat surfaces of said semi-cylindrical members, the length of said strut means and the circumference of the semi-cylindrical surfaces of the end members forming a peripheral dimension for said stabilizing means which is precisely equal to the circumferential dimension of a belt required to be mounted upon the supporting and driving rollers of a battery grid pasting machine.

It is a still further object of the invention to provide the aforementioned strut means in the form of a pair of similar elongated members having cross-sectional dimensions less than the shortest dimension of the flat surface of said aforementioned end members and the opposite ends of said elongated members being flat and the axis of said members being perpendicular to a reasonably precise degree to said flat end surfaces.

It is still another object of the invention to provide said stabilizing means in combination with a belt which extends around the exterior curved surfaces of said semi-cylindrical end members and the manufactured, precise circumferential dimension of said belt being maintained by the belt during shipment and storage and until the same is to be mounted in a battery grid pasting machine.

Details of the foregoing objects and of the invention, as well as other objects thereof, are set forth in the following specification and illustrated in the accompanying drawing comprising a part thereof.

DETAILED DESCRIPTION

Figure 1:
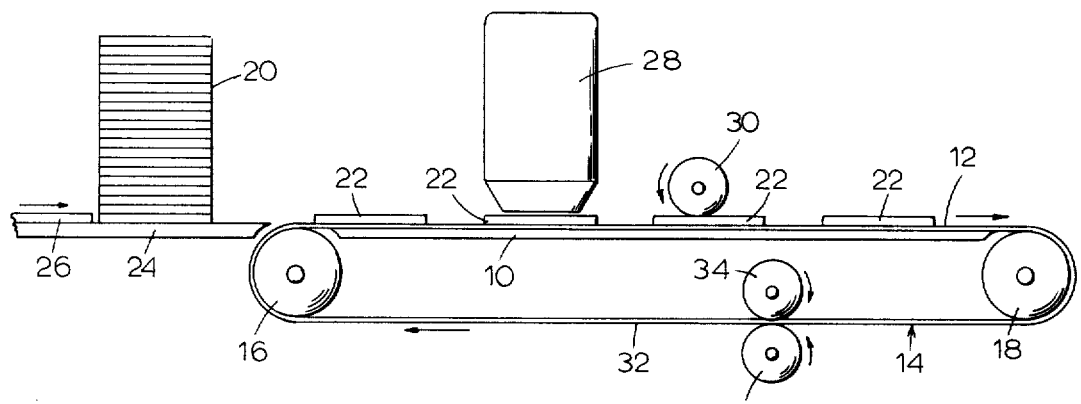
FIG. 1 is an exemplary, somewhat diagrammatic side elevation illustrating the essential features of a typical battery grid pasting machine which includes a belt with which the present invention is concerned.
Figure 2:
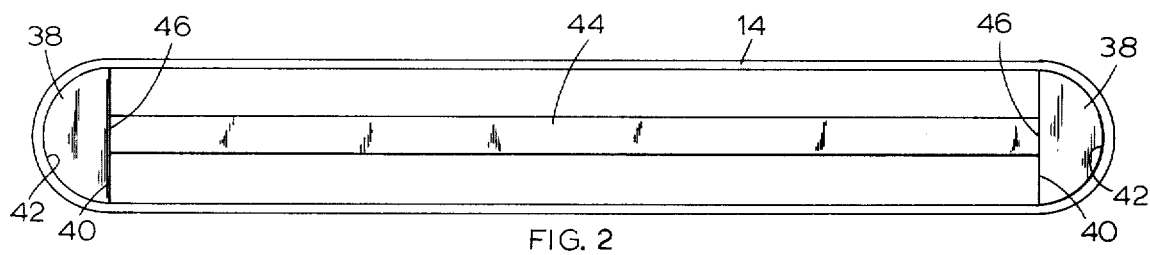
FIG. 2 is a side elevation of stabilizing means comprising the principal feature of the present invention and illustrated in supporting relationship within a belt for a battery grid pasting machine for purposes of maintaining the peripheral dimension thereof precisely constant.
Figure 3:
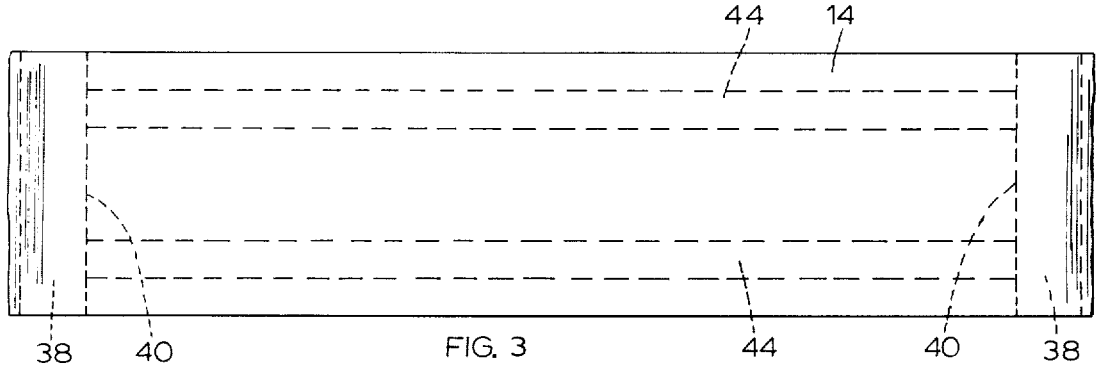
FIG. 3 is a top plan view of the combination of stabilizing means and battery grid pasting belt shown in FIG. 2.
Figure 4:
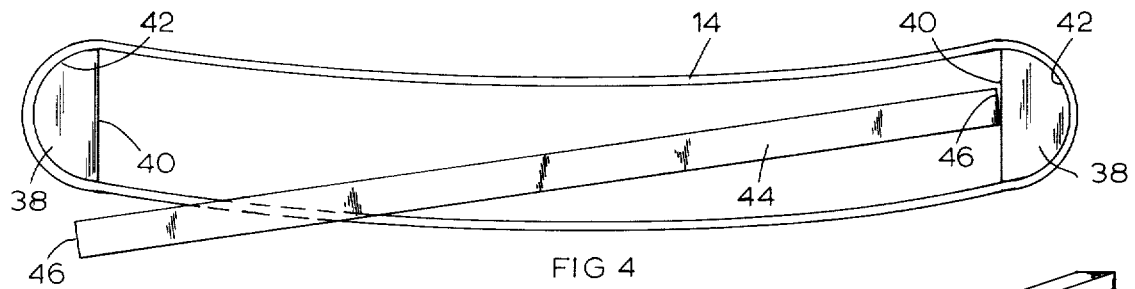
FIG. 4 is a side elevation similar to FIG. 2 but in which the stabilizing means has been partially collapsed incident to removing the same from the belt which has been maintained to fixed size by said means when the same are in the relationship shown in FIG. 2.
Figures 5, 6:
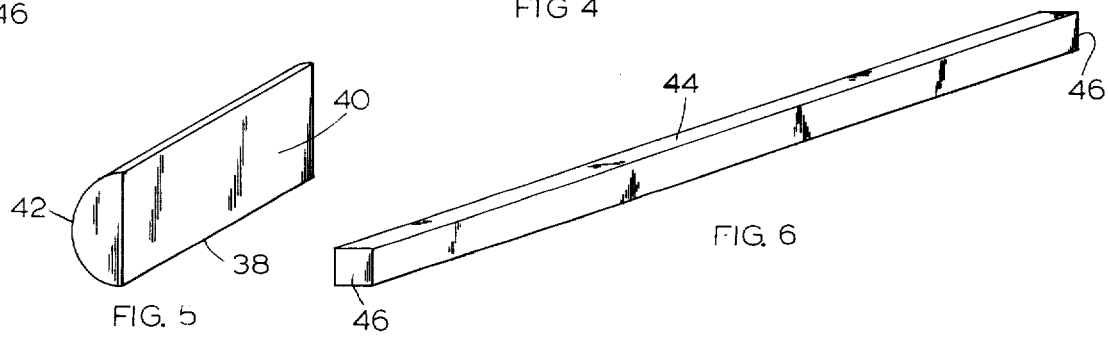
FIG. 5 is a perspective view of one of the end members of the stabilizing means shown in the preceding figures.
FIG. 6 is a perspective view of a preferred embodiment of one of the strut-like spacing members for the stabilizing means shown in FIGS. 2–4.

Referring to FIG. 1, the exemplary and somewhat diagrammatic illustration of a side view of a battery grid pasting machine shown therein comprises a supporting plate 10 upon which the upper course or flight 12 of a pasting belt 14 is disposed, said belt also extending around a pair of similar rollers 16 and 18 which rotate about fixed axes that are spaced apart a fixed, precise distance, which, in relation to the diameter of said rollers defines a precise circumferential dimension to which the belt 14 must be equal. One of the rollers 16 or 18 is driven by power means in accordance with conventional practice.

A supply stack 20 of battery grids or plates 22 which are to be pasted is mounted upon stationary means 24 at the inlet end of the belt 14. Appropriate standard type of means to feed the lowermost plates from the stack 20 are employed, said means including a plunger 26 which operates sequentially to feed, for example, the lowermost or lowermost pair of the battery grids 22 from the bottom of the stack and dispose the same upon the inlet end of the belt 14 by which the individual or pairs of battery grids 22 pass beneath a supply hopper 28 in which the battery grid paste is stored and from which the same is delivered in measured quantity to the battery grids 22 as the same move beneath the hopper 28. Such feeding means is of standard commercial type not comprising part of the present invention. Also, after a desired amount of paste, which comprises certain formulations of lead oxide, water, sulfuric acid and otherwise, has been forced into the openings in the reticulated pattern of the grids 22, the same is compressed therein by appropriate means which is diagrammatically represented by the pressure roller 30 in FIG. 1.

The pasted grids 22 remain upon the upper course 12 of the belt 14 for a desired period of time, during which the belt absorbs a certain amount of moisture from the paste which has been pressed into the openings or interstices of the cast lead grids or plates, whereby when the same have been discharged from the right-hand or exit end of the belt 14, as viewed in FIG. 1, some of the moisture will have been absorbed into the belt, and in order to retain as much absorption capacity as possible within the belt, the lower course 32 thereof is subjected to appropriate squeezing mechanism which, at least diagrammatically, comprises a pair of rollers 34 and 36, which, for example, are appropriately connected by gearing and suitable pressure is applied thereto by which at least a substantial part of the moisture absorbed into the belt is squeezed therefrom into a suitable receptacle or drain means, not shown.

As referred to hereinabove, a typical pasting belt 14 comprises woven textile material of suitable thickness, width and circumference to fulfill the requirements of the grid pasting machine, especially to be of suitable width to accommodate the number of battery grids or plates to be accommodated thereon in transverse manner and also to extend around the circumferences of rollers 16 and 18. The textile material preferably is very largely composed of cotton fibers and in particular, it has been found about 75% of the composition of the textile material should be cotton fibers, and if a higher percentage is used, the absorption capacity of the belt is increased. However, due to the somewhat abrasive nature of the lead oxide paste, as well as the cast lead grids per se, the cotton fibers are not as capable of resisting abrasion as other types of materials which are more abrasion-resistant, such as rubber or textile material formed from fibers, including synthetic resin filaments, which are more resistant to abrasion than cotton. However, such alternate materials do not possess the desired amount of absorption capacity that is required to form pasted battery grids or plates of desired quality. It has been found that if such textile material includes as much as 25% polyester filaments dispersed throughout the material with the major proportion of cotton fibers, adequate absorption capabilities are present to render such belts useful in the machine described above.

As one of the belts 14 continues to be used, the absorption of moisture thereby also results in a small amount of lead oxide being deposited in the pores of the belt and the compression of the belt by the squeezing rollers 34 and 36 does not result in much of the deposited lead oxide being removed from the belt but, rather, results in the belt being further impregnated with said lead oxide. As a result of this, after a number of hours of use of the belt, the absorption capacity thereof has decreased to the limit where the belt is no longer efficient for such purposes and must be replaced by a new belt. As also indicated above, under favorable operating conditions and particularly when using a belt composed of approximately 75% cotton fibers and 25% polyester filaments, said belts may be useful for a period of as long as ten working shifts of eight hours each, for example, thus totalling approximately eighty hours. This is considered a good and acceptable useful life for such belts. It is to be understood, however, that the foregoing example of composition of the belt, as well as the durability and life thereof, are only exemplary and are not to be considered restrictive.

DIMENSION STABILIZING MEANS

The principal feature of the present invention comprises a means to stabilize the accurate manufactured dimension of the belt 14, particularly circumferentially. The foregoing description illustrates that the belt is composed either entirely or very largely of cotton fibers which, as is well-known, are subject to shrinkage when subjected to moisture. Even the limited amount of moisture in normal operative atmospheres of battery grid pasting plants or supply storage rooms included therewith tend to be absorbed by new belts while stored in such establishments, usually in coiled, compact condition. Hence, it has been found that, particularly where the atmosphere has moisture content higher than normal, the shrinkage is more severe than under other circumstances, but in any event, in the absence of some means to preserve the manufactured, accurate circumferential dimension of such belts, it is found that when the time arrives to install the same upon the supporting rollers 16 and 18 of the machine, the shrinkage is such that the belts will not fit and cannot be mounted upon the rolls in the manner desired and intended. Under normal circumstances, the belts will not tolerate any substantial amount of shrinkage effected by conventional means such as available in a battery grid pasting plant, whereby it is necessary to send such belts of decreased circumferential dimension back to the factory, either for replacement or for the same to be stretched by suitable means which will not result in damage to the belts. By way of example, a typical belt of the type commonly used in battery grid pasting plants is approximately ¼ inch thick, aobut 13 inches wide, and approximately 100 inches in circumference. A belt of such size formed from all cottom fibers or a very high percentage thereof is capable of possessing substantial resistance to being stretched, particularly incident to attempting to mount the same upon the precisely positioned rollers 16 and 18 of a battery grid pasting machine, where the belt has been subjected to appreciable shrinkage.

In accordance with the principles of the present invention, dimension stabilizing means may be provided very simply and inexpensively in the form of a pair of preferably semi-cylindrical end members 38, which preferably have flat surfaces 40 which extend between the edges of the members from which the semi-cylindrical outer surfaces 42 extend. A relatively inexpensive source of the end members 38 is wood, and under such circumstances, said members preferably are of a solid nature. However, it is conceivable that the members 38 may be molded from synthetic resin, paper composite, or formed from sheet metal of suitable gauge, adequate to maintain the shapes of said members when they are formed in hollow manner.

The end members 38 are maintained in precisely longitudinal spaced relationship by strut means comprising preferably a plurality of elongated members 44, the opposite ends 46 of which are formed so as to be flat surfaces relative to which the elongated axis of the members 44 is preferably precisely perpendicular. The use of a pair of said strut members 44 is preferred so as to render the same more readily collapsible by being removed from the flat, inner surfaces 40 of the end members 38 when it is desired to remove the stabilizing means from a belt 14 immediately prior to mounting the belt in the battery grid pasting machine. Further to facilitate the collapsing of the stabilizing means, it is preferred that the transverse dimensions of the strut members 44 are substantially less than the shortest dimension of the flat surface 40 of the end members 38. The members 44 also, for a minimum cost, may be made from wood, although other suitable material, such as tubular metal or snythetic resin may be employed, if desired. The essential thing is that the length of said strut-like members 44 shall be constant and, similarly, the exterior dimensions and shape of the end members 38 also should be reasonably constant.

In accordance with current manufacturing costs, it has been found that stabilizing means comprising a pair of the end members 38 and a pair of the strut members 44 may be supplied to factories at a cost of less than one dollar in accordance with current rates. Considering the fact that the cost of the belts 14 is many times this amount, and also considering the nuisance and loss of time incurred in sending shrunken belts back to a factory to be reconditioned or stretched, it has been found  the industry will readily accept the small additi  st of a battery grind pasting belt when supplie  n the stabilizing means comprising the present invention, it being understood that the stabilizing means is assembled within the belt at the time it is manufactured and has a precise desired circumferential dimension and transverse width. In particular, the circumferential dimension is maintained constant even when the belt is subjected to atmospheres having appreciable moisture which otherwise tend to shrink the belt and decrease the circumferential dimension, thereby rendering the same unfit for immediate mounting in a battery grid pasting machine, without being suitably stretched under controlled, factory conditions, for example.

From the foregoing, it will be seen that the present invention provides a relatively simple and inexpensive assembly of few and simple parts comprising stabilizing means by which the circumferential dimension of a battery grid pasting belt is maintained from the time it is manufactured to an accurate dimension to the time it is installed upon supporting rollers in a battery grid pasting machine which requires a pasting belt of very accurate and precise circumferential dimension. The stabilizing means embodying the principles of the invention is quickly and readily mounted within a newly manufactured belt. Similarly, the same is readily and easily collapsed and removed from the belt prior to installing the belt in the pasting machine, such collapsing requiring no sophisticated tools, and, if desired, the components of the collapsed stabilizing means may readily be assembled and returned to the belt manufacturer for reuse.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A battery grid pasting belt of predetermined length, in combination with a collapsible dimension stabilizing assembly disposed within and supporting said belt during storage and until installation thereof in a battery grid pasting machine to prevent shrinkage of said belt, said collapsible assembly comprising a pair of similar end members each having a belt-engaging surface substantially free of sharp edges and a substantially flat face opposite said belt-engaging surface thereof, and elongated strut-like spacing means removably positioned between and abutting said flat faces of said end members, said spacing means having a precise predetermined length which when doubled and added to the circumference of said belt-engaging surfaces of both said end members is precisely equal to the length of said pasting belt required for installation on a battery grid pasting machine, whereby said stabilizing assembly maintains said pre-determined length of said belt and enables the same to be installed upon a pasting machine without alteration of the belt to effect such installation.

2. The belt supporting assembly according to claim 1 in which said belt-engaging surfaces of said end members are substantially semi-cylindrical and the opposite ends of said spacing strut-like means abut said flat surfaces of said end members midway between the opposite longitudinal edges thereof and are maintained in such abutting relationship by said pasting belt which extends around said end members for support thereby.

3. The belt supporting assembly according to claim 1 in which said strut-like means comprises a pair of similar elongated members of equal length, said members having flat end surfaces extending across the entire width of said members and the axes of said members being precisely perpendicular to said end surfaces.

4. The belt supporting assembly according to claim 1 in which the cross-sectional dimension of said strut-like spacing means in a direction parallel to the flat faces of said end members is less than the transverse dimension of said end members.

* * * * *